US010264439B2

(12) United States Patent
Hakola et al.

(10) Patent No.: US 10,264,439 B2
(45) Date of Patent: Apr. 16, 2019

(54) METHOD AND APPARATUS FOR DISCOVERING DEVICES AND APPLICATION USERS

(71) Applicant: AVAGO TECHNOLOGIES INTERNATIONAL SALES PTE. LIMITED, Singapore (SG)

(72) Inventors: Sami-Jukka Hakola, Kempele (FI); Guillaume Sebire, Espoo (FI); Samuli Turtinen, Ii (FI); Vlora Rexhepi, Den Hoom (NL)

(73) Assignee: AVAGO TECHNOLOGIES GENERAL IP (SINGAPORE) PTE. LTD., Singapore (SG)

(*) Notice: Subject to any disclaimer, the term of this patent is extended or adjusted under 35 U.S.C. 154(b) by 71 days.

(21) Appl. No.: 15/180,773

(22) Filed: Jun. 13, 2016

(65) Prior Publication Data

US 2016/0373916 A1 Dec. 22, 2016

Related U.S. Application Data

(63) Continuation of application No. 14/242,936, filed on Apr. 2, 2014, now Pat. No. 9,369,859.

(60) Provisional application No. 61/807,684, filed on Apr. 2, 2013.

(51) Int. Cl.
| | | |
|---|---|---|
| H04B 7/24 | (2006.01) | |
| H04W 8/00 | (2009.01) | |
| H04W 12/08 | (2009.01) | |
| H04W 4/02 | (2018.01) | |
| H04W 4/21 | (2018.01) | |
| H04W 76/14 | (2018.01) | |

(52) U.S. Cl.
CPC .......... *H04W 8/005* (2013.01); *H04W 4/023* (2013.01); *H04W 4/21* (2018.02); *H04W 12/08* (2013.01); *H04W 76/14* (2018.02)

(58) Field of Classification Search
CPC ..... H04W 8/005; H04W 84/18; H04W 88/06; H04W 64/00; H04W 76/02; H04W 76/023; H04W 4/02; H04W 4/023; H04W 4/206; H04M 1/7253
USPC ....................................................... 455/41.2
See application file for complete search history.

(56) References Cited

U.S. PATENT DOCUMENTS

| | | | | |
|---|---|---|---|---|
| 9,713,182 | B2 * | 7/2017 | Baek ................... | H04W 8/005 |
| 2008/0159139 | A1 * | 7/2008 | Smith ................ | H04L 41/5035 |
| | | | | 370/231 |
| 2008/0311923 | A1 * | 12/2008 | Petrovic .............. | H04W 76/11 |
| | | | | 455/450 |
| 2009/0268635 | A1 * | 10/2009 | Gallagher ............... | H04W 8/08 |
| | | | | 370/254 |
| 2011/0103264 | A1 * | 5/2011 | Wentink ............... | H04W 8/005 |
| | | | | 370/255 |

(Continued)

*Primary Examiner* — April G Gonzales
(74) *Attorney, Agent, or Firm* — Xsensus/Broadcom

(57) ABSTRACT

A method, apparatus and computer program for discovery of network devices and application user. An example method for use in an access point or station may comprise receiving a discovery request from an application, the application running thereon, the discovery request including at least one application level identifier, causing monitoring of a discovery channel for at least one device within a proximate distance, and upon discovery of a device associated with the application level ID, providing an indication to the application of the discovery of the device.

20 Claims, 12 Drawing Sheets

(56) References Cited

U.S. PATENT DOCUMENTS

| | | | |
|---|---|---|---|
| 2012/0179789 A1* | 7/2012 | Griot | H04W 12/08 |
| | | | 709/220 |
| 2013/0303088 A1* | 11/2013 | Watfa | H04W 76/14 |
| | | | 455/41.2 |
| 2014/0022986 A1* | 1/2014 | Wu | H04W 48/16 |
| | | | 370/328 |
| 2014/0057667 A1* | 2/2014 | Blankenship | H04L 67/303 |
| | | | 455/500 |
| 2014/0162688 A1* | 6/2014 | Edge | H04W 8/005 |
| | | | 455/456.1 |
| 2014/0194114 A1* | 7/2014 | Kuo | H04W 72/048 |
| | | | 455/426.1 |
| 2015/0148074 A1* | 5/2015 | Phan | H04W 4/021 |
| | | | 455/456.3 |

* cited by examiner

METHOD AND APPARATUS FOR DISCOVERING DEVICES AND APPLICATION USERS

CROSS-REFERENCE TO RELATED APPLICATIONS

This application is a continuation of and is based upon and claims the benefit of priority under 35 U.S.C. § 120 from U.S. Ser. No. 14/242,936, filed Apr. 2, 2014, which claims the benefit of provisional application U.S. Ser. No. 61/807,684; the contents of each of which are incorporated herein by reference.

TECHNOLOGICAL FIELD

Embodiments of the present invention relate generally to a method, apparatus, and computer program product for discovering network devices and application users in near proximity.

BACKGROUND

Proximity-based applications and services are a recent and enormous socio-technological trend. Proximity-based applications may be able to discover instances of applications running in devices that are within proximity of each other, and may then also exchange application-related data.

Current methods are limited given that all discovery related traffic and signaling as well as application related data exchanged may be routed through the network. This may negatively impact network performance and add unnecessary load. These current limitations may also impede creation of more advanced proximity-based applications.

BRIEF SUMMARY

A method, apparatus and computer program product are therefore provided according to an example embodiment of the present invention for the discovery of network devices and application users in near proximity. An example method provides for discovery of user equipment (UE)s and of Application users in proximity of each other, using direct radio signals (discovery signals) exchanged between UEs on a common discovery channel, while minimizing the amount of signaling on this channel, without jeopardizing the confidentiality and privacy of the permanent identities of the UE in the Evolved Packet System (EPS) (such as International mobile subscriber identity (IMSI), International Mobile Equipment Identity (IMEI)) and of the Application user identity (such as Bob@socialApp), and allowing full control by the network operator.

In one example embodiment, a method is provided. The method for use in a station may comprise receiving a discovery request from an application, the application running thereon, the discovery request including at least one application level identifier (ID), causing monitoring of a discovery channel for at least one device within a proximate distance, and upon discovery of a device associated with the application level ID, providing an indication to the application of the discovery of the device. In one embodiment, the station is a Proximity Service (ProSe)-enabled user device and the application is a ProSeenabled application. In one embodiment, the method may comprise upon receiving the discovery request, providing a server with a request for a user equipment (UE) ID associated with the application level ID, receiving the UE ID from the server, wherein monitoring is performed by monitoring an occurrence of the UE ID on the discovery channel.

In one embodiment, the method may comprise receiving a discovery signal indicating a UE ID, and determining if a record associating the UE ID to an application level ID is stored therein, and providing notification to the application of the discovery of the second application level ID. In one embodiment, the method may comprise upon receiving the discovery request, providing a server with a request for a UE ID associated with the application level ID, receiving the UE ID and a corresponding index value, wherein monitoring is performed by monitoring for an occurrence of the UE ID and the corresponding index value on the discovery channel, and wherein, providing an indication to the ProSe-enabled application of the discovery of the device is performed subsequent to discovering an occurrence of the UE ID and the corresponding index value on the discovery channel. In one embodiment, the index value indicates that an application user is active and has provided a request to be discovered. In one embodiment, the method may comprise receiving a discovery signal indicating a UE ID and an index value, determining if a record associating the UE ID to an application level ID is stored therein, determining if the index value matches the corresponding index value received from the server, and providing notification to the application of the discovery of the second application level ID. In one embodiment, the method may comprise a UE ID is one of a S-Temporary Mobile Subscriber Identity (S-TMSI), a ProSe ID, and a Non-Access-Stratum (NAS) level identifier. In one embodiment, a UE ID belongs to one of a public address space and a private address space.

In another embodiment, a method for use in an access point may be provided, the method may comprise receiving a request from an application stored therein, to make an application user discoverable, wherein the request includes an application level ID, determining an application ID of the requesting application, and providing the application ID, a UE ID, and the application level ID to a ProSe server. In one embodiment, the method may comprise providing a UE identifier to a ProSe server, receiving from the ProSe server, after positive determination of ProSe authorization, an acknowledgement of registration, and providing notification to at least one application stored therein, of UE ProSe enablement. In one embodiment, application identifier is a digital signature or provides a link to a digital signature, verifying that an application is authorized for ProSe discovery or communication. In one embodiment, a UE ID is one of a S-TMSI, a ProSe ID, and a NAS level identifier.

In one embodiment of the present invention, an apparatus may be provided. The apparatus may comprise at least one processor and at least one memory including computer program code, the at least one memory and the computer program code configured to, with the processor, cause the apparatus to at least receive a discovery request from an application, the application running thereon, the discovery request including at least one application level identifier (ID), cause monitoring of a discovery channel for at least one device within a proximate distance, and upon discovery of a device associated with the application level ID, provide an indication to the application of the discovery of the device.

In one embodiment, the station is a ProSe-enabled user device and the application is a ProSeenabled application. In one embodiment, at least one memory and the computer program code are further configured to, with the processor, cause the apparatus to upon receiving the discovery request, provide a server with a request for a user equipment (UE) ID associated with the application level ID, receive the UE ID from the server, wherein monitoring is performed by monitoring an occurrence of the UE ID on the discovery channel.

In one embodiment, the at least one memory and the computer program code are further configured to, with the processor, cause the apparatus to receive a discovery signal indicating a UE ID, and determine if a record associating the UE ID to an application level ID is stored therein, and providing notification to the application of the discovery of the second application level ID. In one embodiment, the at least one memory and the computer program code are further configured to, with the processor, cause the apparatus to upon receiving the discovery request, provide a server with a request for a UE ID associated with the application level ID, receive the UE ID and a corresponding index value, wherein monitoring is performed by monitoring for an occurrence of the UE ID and the corresponding index value on the discovery channel, and wherein, providing an indication to the ProSe-enabled application of the discovery of the device is performed subsequent to discovering an occurrence of the UE ID and the corresponding index value on the discovery channel.

In one embodiment, the index value indicates that an application user is active and has provided a request to be discovered. In one embodiment, the at least one memory and the computer program code are further configured to, with the processor, cause the apparatus to receive a discovery signal indicating a UE ID and an index value, determine if a record associating the UE ID to an application level ID is stored therein, determine if the index value matches the corresponding index value received from the server, and provide notification to the application of the discovery of the second application level ID. In one embodiment, a UE ID is one of a S-Temporary Mobile Subscriber Identity (S-TMSI), a ProSe ID, and a Non-Access-Stratum (NAS) level identifier. In one embodiment, a UE ID belongs to one of a public address space and a private address space.

In another embodiment of the present invention, an apparatus may be provided, the apparatus may comprise at least one processor and at least one memory including computer program code, the at least one memory and the computer program code configured to, with the processor, cause the apparatus to at least receive a request from an application stored therein, to make an application user discoverable, wherein the request includes an application level ID, determine an application ID of the requesting application, and provide the application ID, a UE ID, and the application level ID to a ProSe server.

In one embodiment, at least one memory and the computer program code are further configured to, with the processor, cause the apparatus to provide a UE identifier to a ProSe server, receive from the ProSe server, after positive determination of ProSe authorization, an acknowledgement of registration, and provide notification to at least one application stored therein, of UE ProSe enablement. In one embodiment, the application identifier is a digital signature or provides a link to a digital signature, verifying that an application is authorized for ProSe discovery or communication. In one embodiment, the UE ID is one of a S-TMSI, a ProSe ID, and a NAS level identifier.

In another embodiment of the present invention, a computer program product may be provided, the computer program product may comprise at least one non-transitory computer-readable storage medium having computer-executable program code portions stored therein, the computer-executable program code portions comprising program code instructions for a discovery request from an application, the application running thereon, the discovery request including at least one application level identifier (ID), causing monitoring of a discovery channel for at least one device within a proximate distance, and upon discovery of a device associated with the application level ID, providing an indication to the application of the discovery of the device.

In one embodiment, the station is a ProSe-enabled user device and the application is a ProSeenabled application. In one embodiment the computer-executable program code portions further comprise program code instructions for upon receiving the discovery request, providing a server with a request for a user equipment (UE) ID associated with the application level ID, receiving the UE ID from the server, wherein monitoring is performed by monitoring an occurrence of the UE ID on the discovery channel.

In one embodiment, the computer-executable program code portions further comprise program code instructions for receiving a discovery signal indicating a UE ID, and determining if a record associating the UE ID to an application level ID is stored therein, and providing notification to the application of the discovery of the second application level ID.

In one embodiment, computer-executable program code portions further comprise program code instructions for upon receiving the discovery request, providing a server with a request for a UE ID associated with the application level ID, receiving the UE ID and a corresponding index value, wherein monitoring is performed by monitoring for an occurrence of the UE ID and the corresponding index value on the discovery channel, and wherein, providing an indication to the ProSe-enabled application of the discovery of the device is performed subsequent to discovering an occurrence of the UE ID and the corresponding index value on the discovery channel.

In one embodiment, the index value indicates that an application user is active and has provided a request to be discovered. In one embodiment, the computer-executable program code portions further comprise program code instructions for receiving a discovery signal indicating a UE ID and an index value, determining if a record associating the UE ID to an application level ID is stored therein, determining if the index value matches the corresponding index value received from the server, and providing notification to the application of the discovery of the second application level ID. In one embodiment, a UE ID is one of a S-Temporary Mobile Subscriber Identity (S-TMSI), a ProSe ID, and a Non-Access-Stratum (NAS) level identifier. In one embodiment, UE ID belongs to one of a public address space and a private address space.

In another embodiment of the present invention, a computer program product is provided comprising at least one non-transitory computer-readable storage medium having computer-executable program code portions stored therein, the computer-executable program code portions comprising program code instructions for receiving a request from an application stored therein, to make an application user discoverable, wherein the request includes an application level ID, determining an application ID of the requesting application, and providing the application ID, a UE ID, and the application level ID to a ProSe server.

In one embodiment, the computer-executable program code portions further comprise program code instructions for providing a UE identifier to a ProSe server, receiving from the ProSe server, after positive determination of ProSe authorization, an acknowledgement of registration, and providing notification to at least one application stored therein, of UE ProSe enablement. In one embodiment, the application identifier is a digital signature or provides a link to a digital signature, verifying that an application is authorized for ProSe discovery or communication. In one embodiment, the UE ID is one of a S-TMSI, a ProSe ID, and a NAS level identifier.

In another embodiment of the present invention, an apparatus is provided comprising means for receiving a discovery request from an application, the application running thereon, the discovery request including at least one application level identifier (ID), means for causing monitoring of a discovery channel for at least one device within a proximate distance, and upon discovery of a device associated with the application level ID, means for providing an indication to the application of the discovery of the device. In one embodiment, the station is a ProSe-enabled user device and the application is a ProSeenabled application. In one embodiment, the apparatus may further comprise upon receiving the discovery request, providing a server with a request for a user equipment (UE) ID associated with the application level ID, receiving the UE ID from the server, wherein monitoring is performed by monitoring an occurrence of the UE ID on the discovery channel.

In one embodiment, the apparatus may further comprise receiving a discovery signal indicating a UE ID, and determining if a record associating the UE ID to an application level ID is stored therein, and providing notification to the application of the discovery of the second application level ID. In one embodiment, the apparatus may further comprise upon receiving the discovery request, providing a server with a request for a UE ID associated with the application level ID, receiving the UE ID and a corresponding index value, wherein monitoring is performed by monitoring for an occurrence of the UE ID and the corresponding index value on the discovery channel, and wherein, providing an indication to the ProSe-enabled application of the discovery of the device is performed subsequent to discovering an occurrence of the UE ID and the corresponding index value on the discovery channel.

In one embodiment, the index value indicates that an application user is active and has provided a request to be discovered. In one embodiment, the apparatus may further comprise receiving a discovery signal indicating a UE ID and an index value, determining if a record associating the UE ID to an application level ID is stored therein, determining if the index value matches the corresponding index value received from the server, and providing notification to the application of the discovery of the second application level ID.

In one embodiment, the UE ID is one of a S-Temporary Mobile Subscriber Identity (S-TMSI), a ProSe ID, and a Non-Access-Stratum (NAS) level identifier. In one embodiment, UE ID belongs to one of a public address space and a private address space.

In another embodiment of the present invention, an apparatus is provided comprising means for receiving a request from an application stored therein, to make an application user discoverable, wherein the request includes an application level ID, means for determining an application ID of the requesting application, and means for providing the application ID, a UE ID, and the application level ID to a ProSe server. In one embodiment, the apparatus may further comprise means for providing a UE identifier to a ProSe server, means for receiving from the ProSe server, after positive determination of ProSe authorization, an acknowledgement of registration, and means for providing notification to at least one application stored therein, of UE ProSe enablement. In one embodiment, the application identifier is a digital signature or provides a link to a digital signature, verifying that an application is authorized for ProSe discovery or communication. In one embodiment, the UE ID is one of a S-TMSI, a ProSe ID, and a NAS level identifier.

BRIEF DESCRIPTION OF THE DRAWINGS

Figure 1:
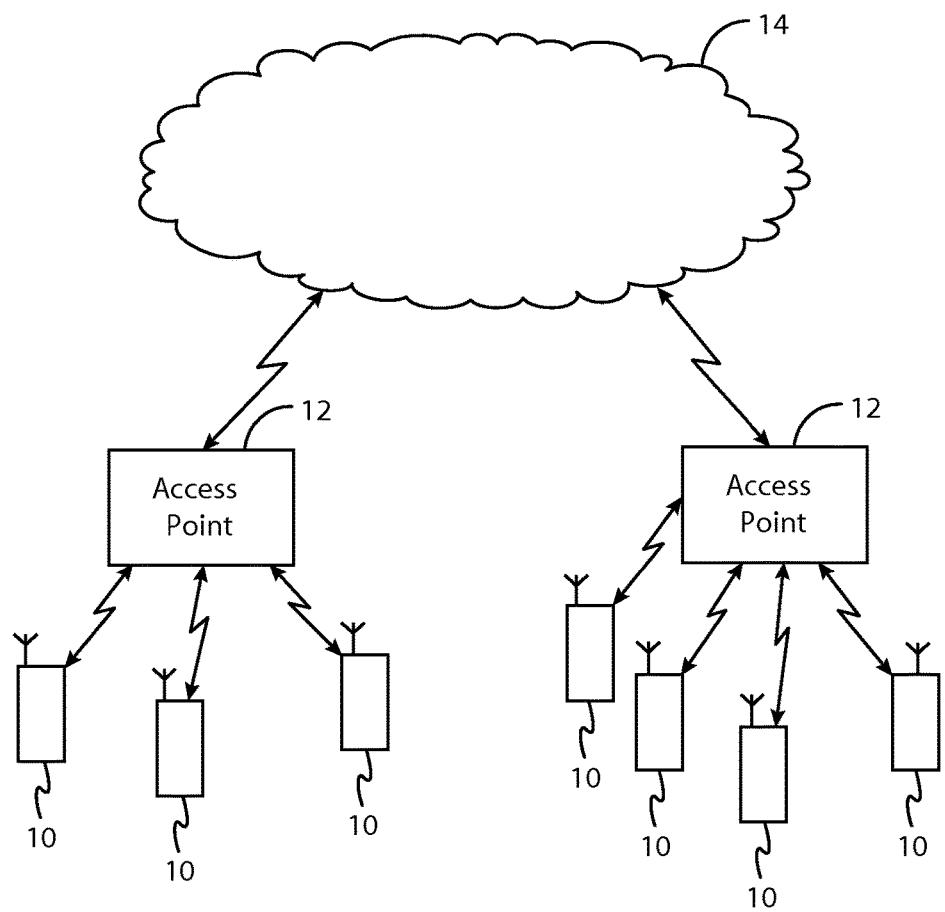
Figure 2:
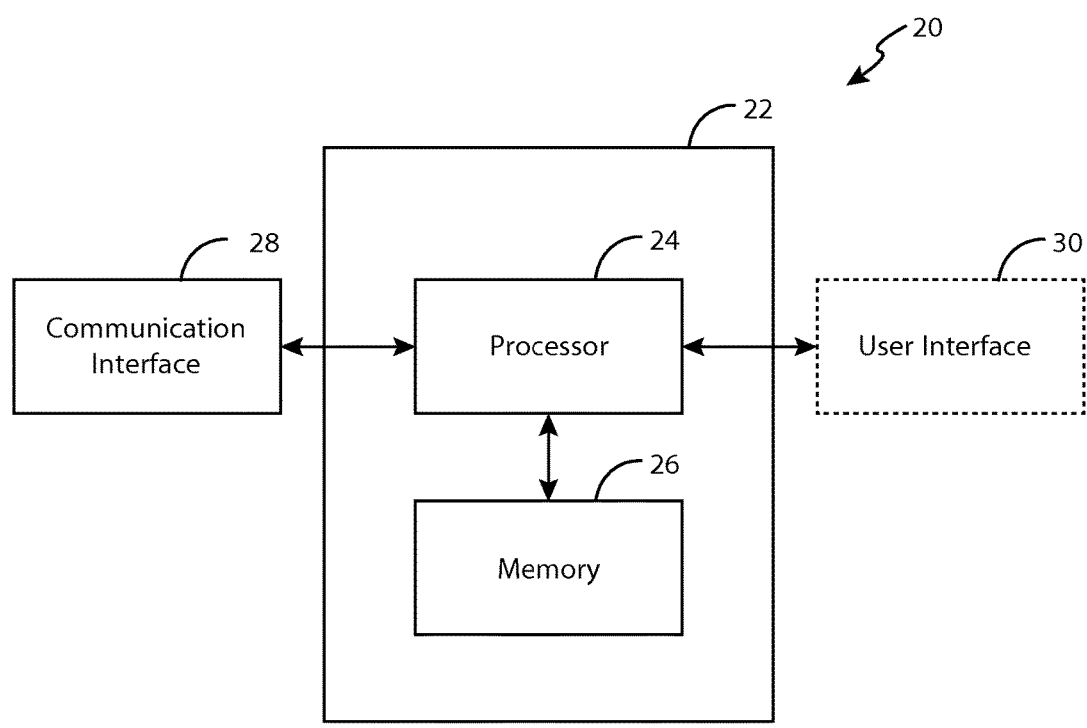
Figure 3:
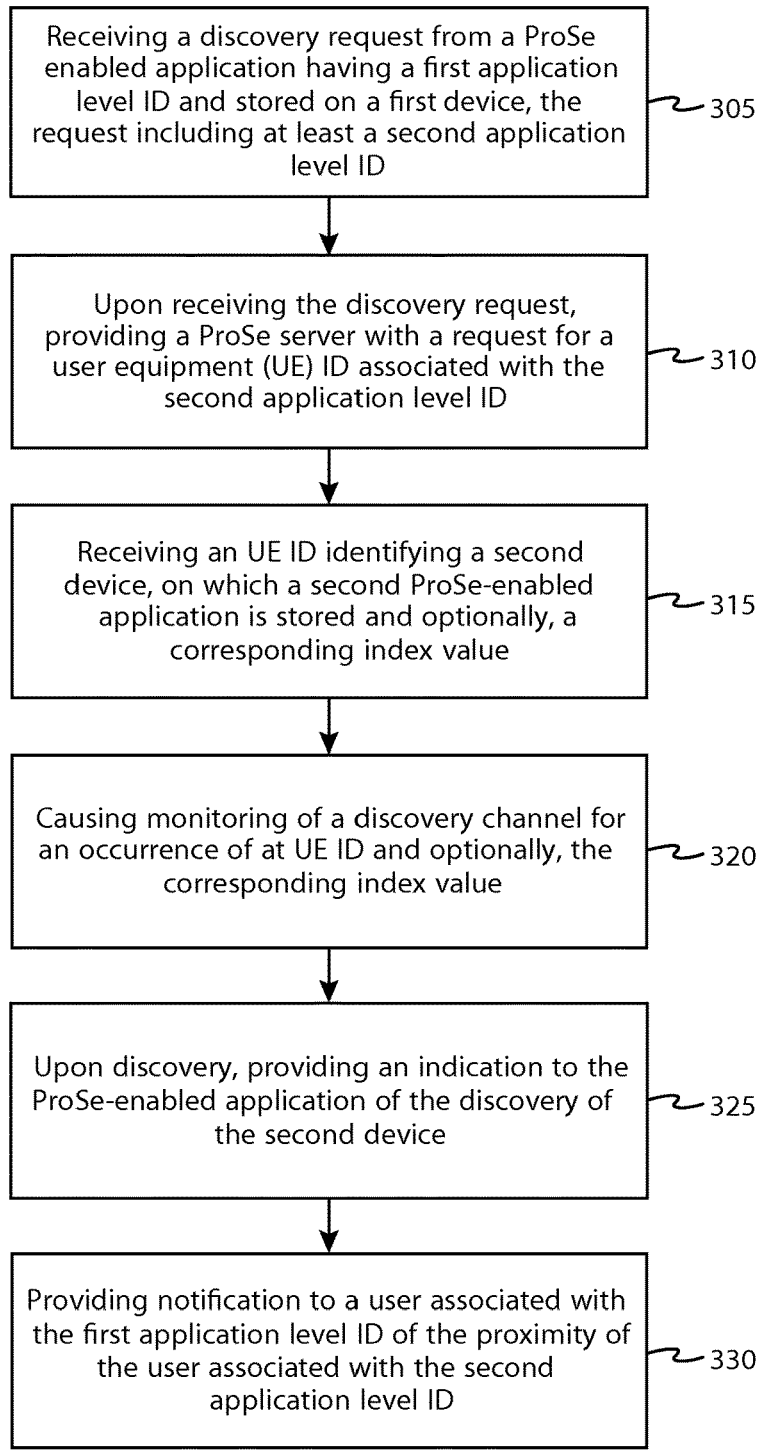

Having thus described embodiments of the invention in general terms, reference will now be made to the accompanying drawings, which are not necessarily drawn to scale, and wherein:

FIG. 1 is block diagram of a system that may be specifically configured in accordance with an example embodiment of the present invention;

FIG. 2 is a block diagram of an apparatus that may be specifically configured in accordance with an example embodiment of the present invention;

FIG. 3 is an example flowchart illustrating a method of operating an example apparatus in accordance with an embodiment of the present invention.

Figure 4A:
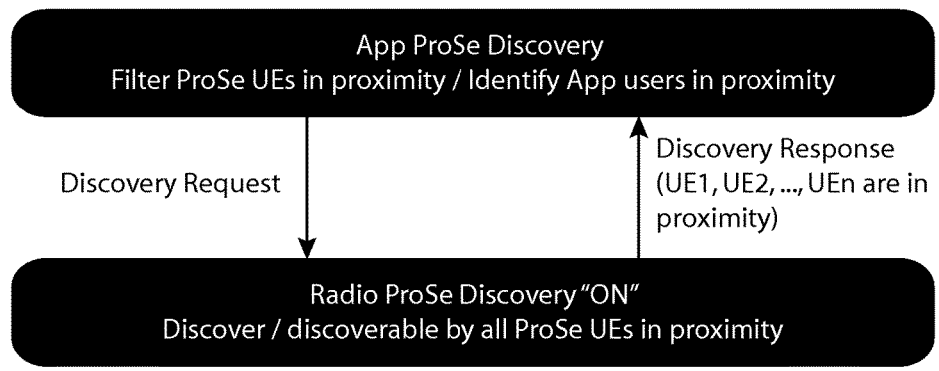
Figure 4B:
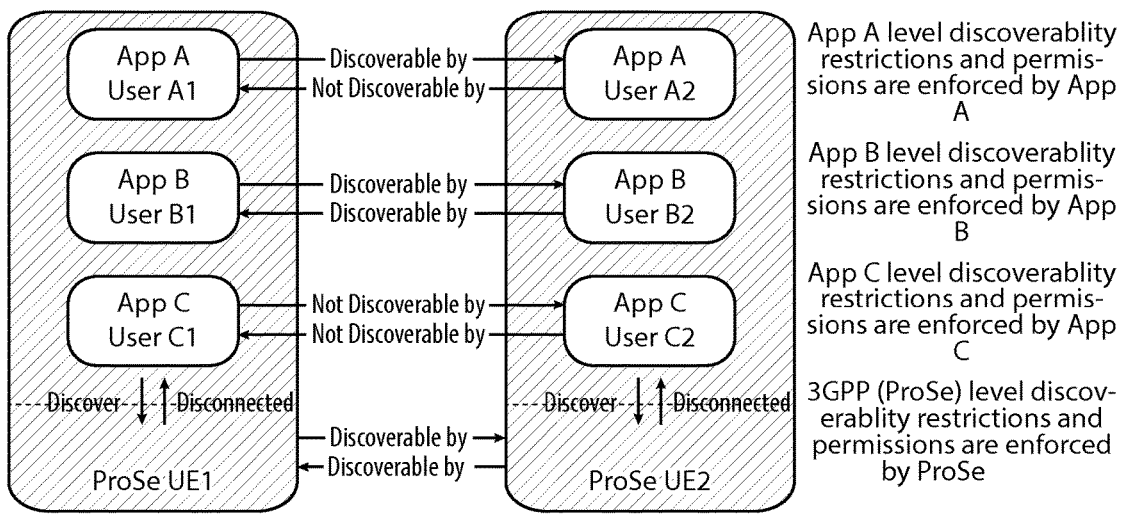
Figure 5:
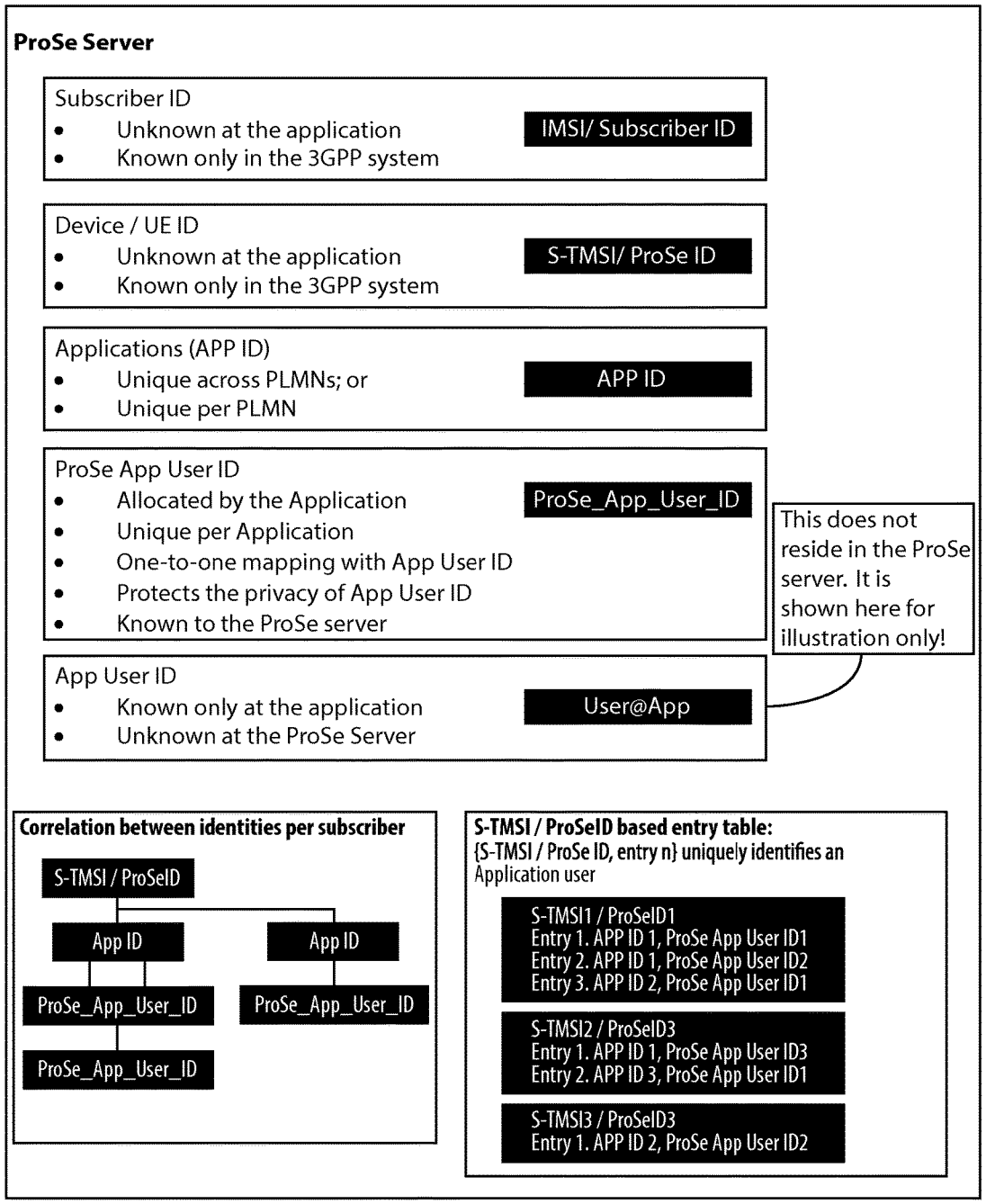
Figure 6A:
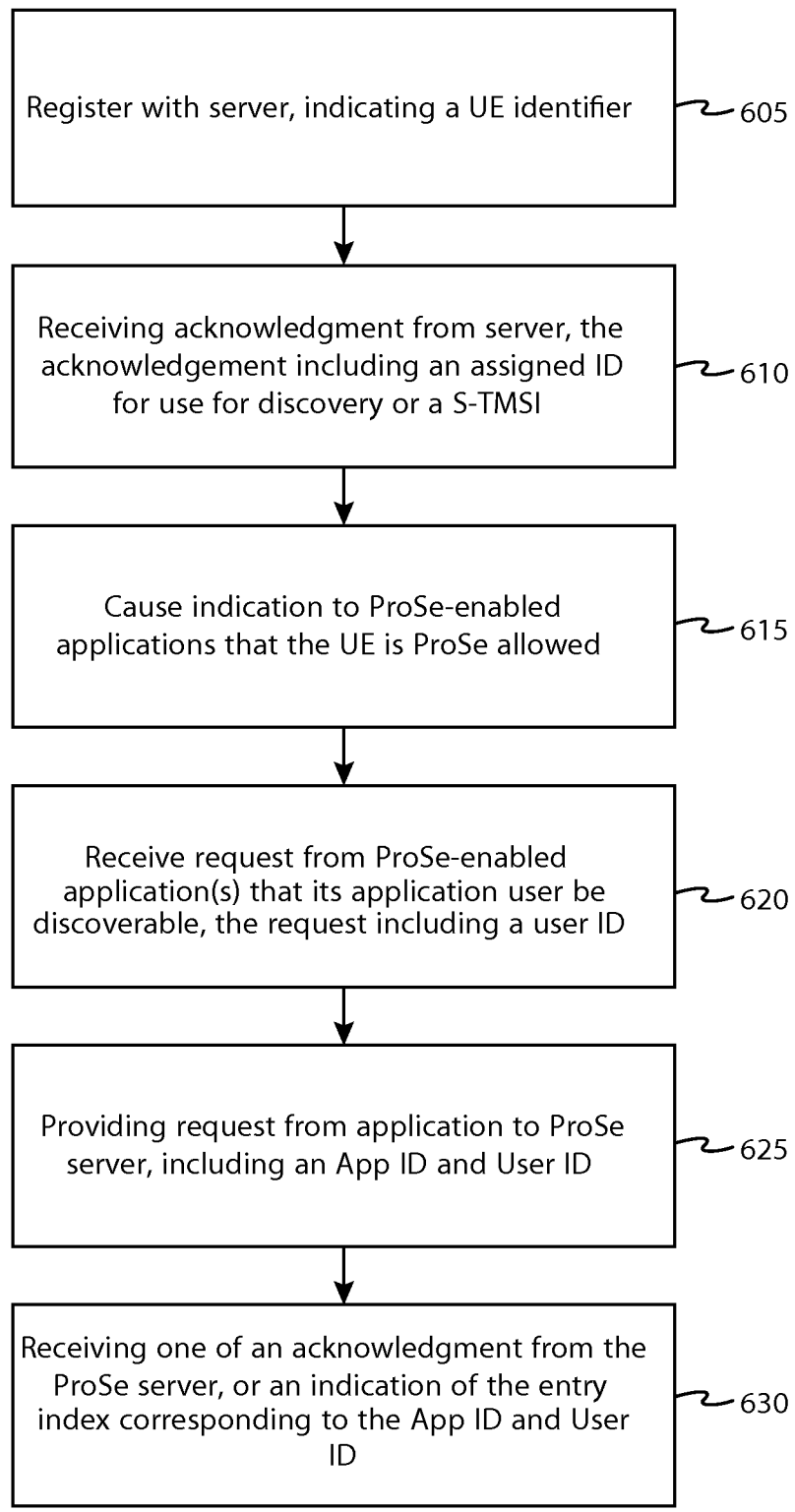
Figure 6B:
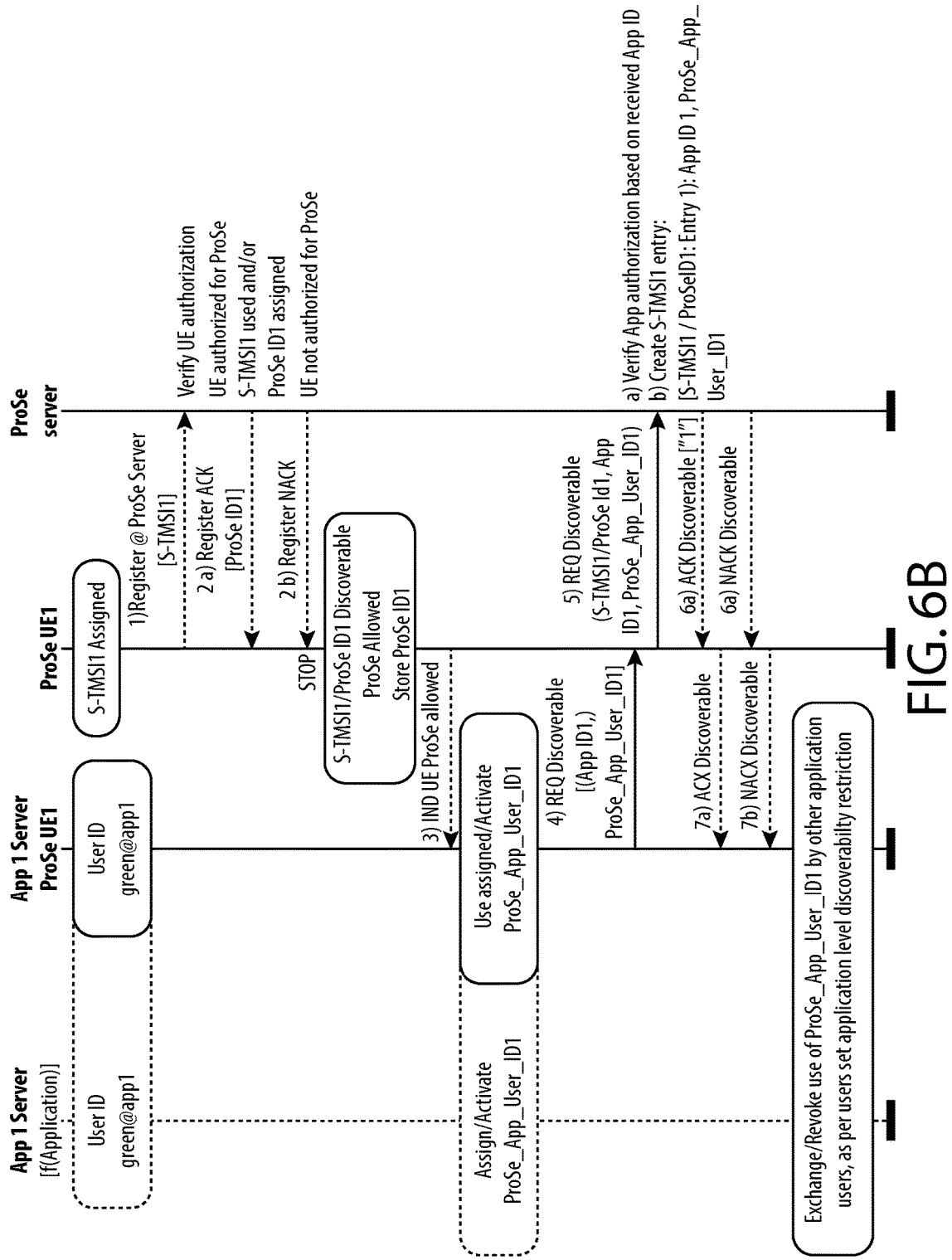
Figure 7:
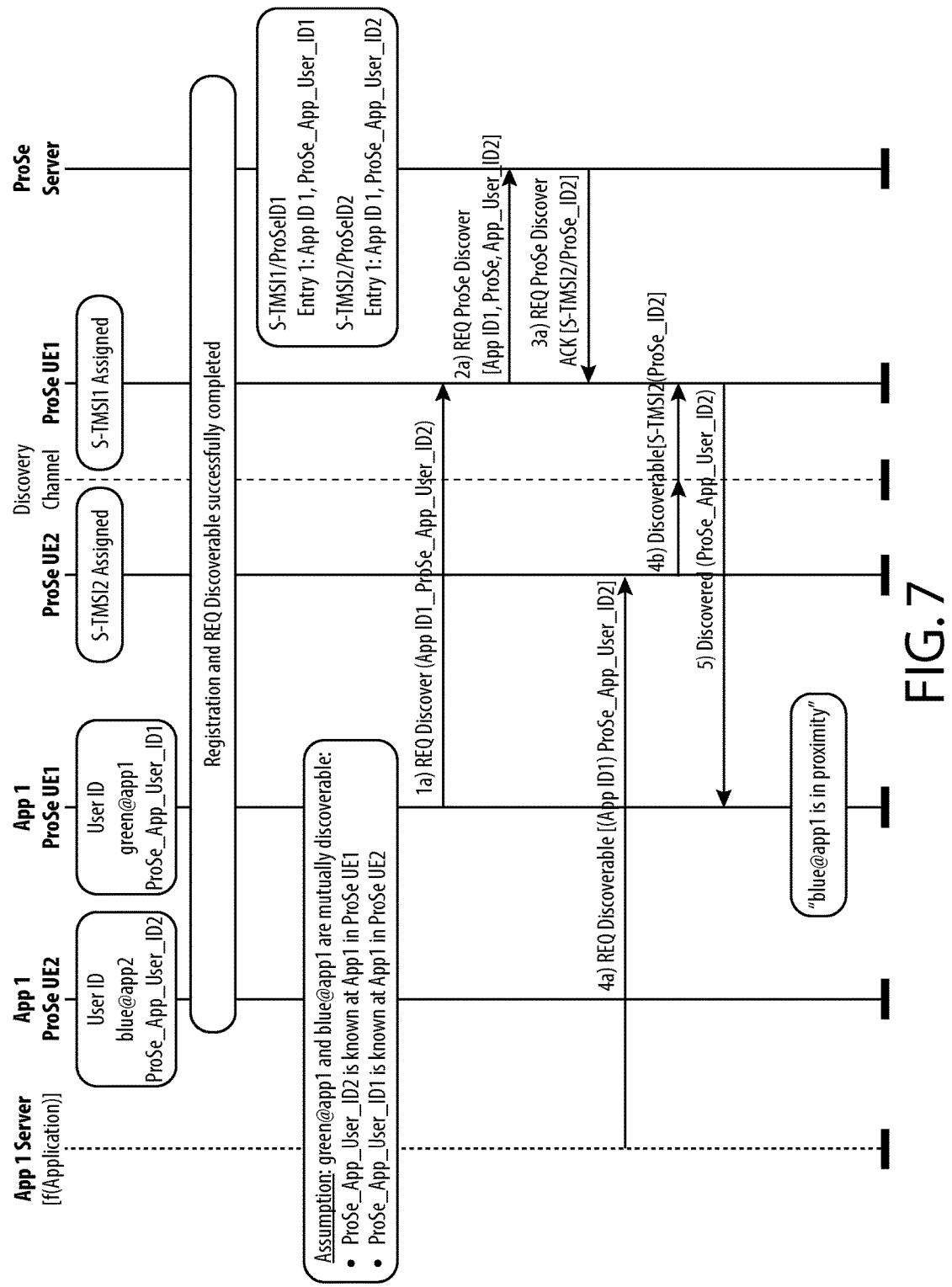
Figure 8:
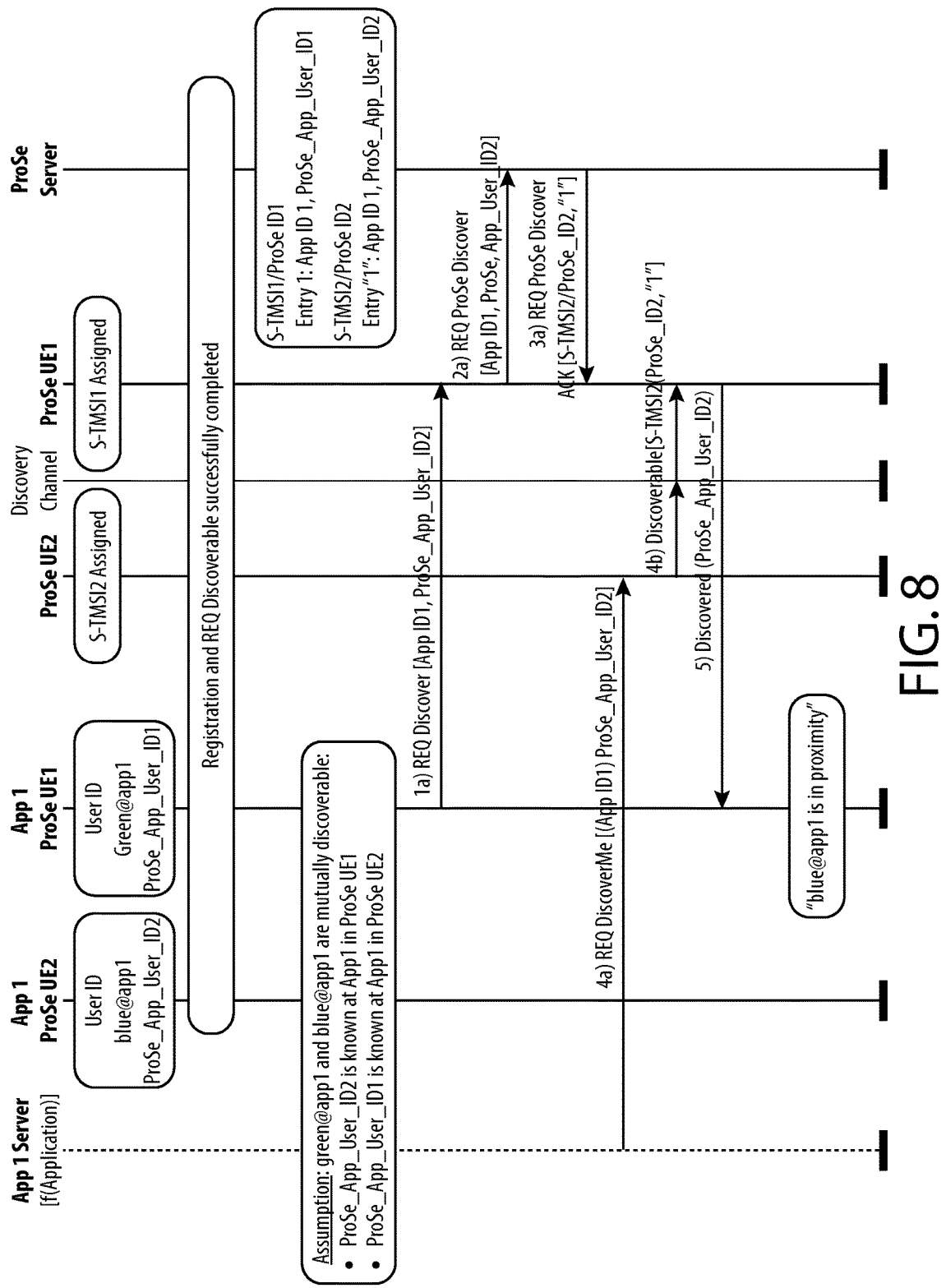
Figure 9A:
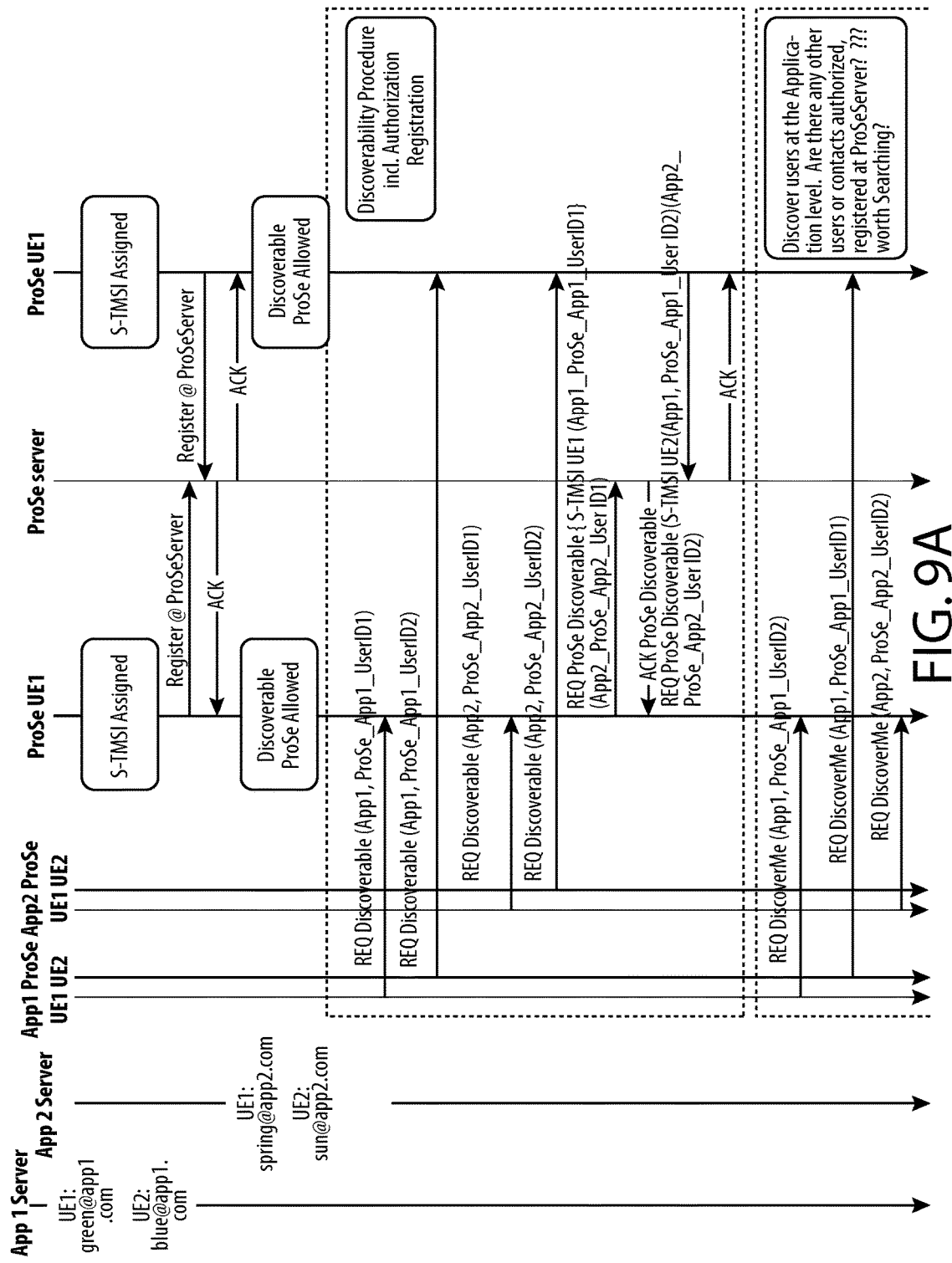
Figure 9B:
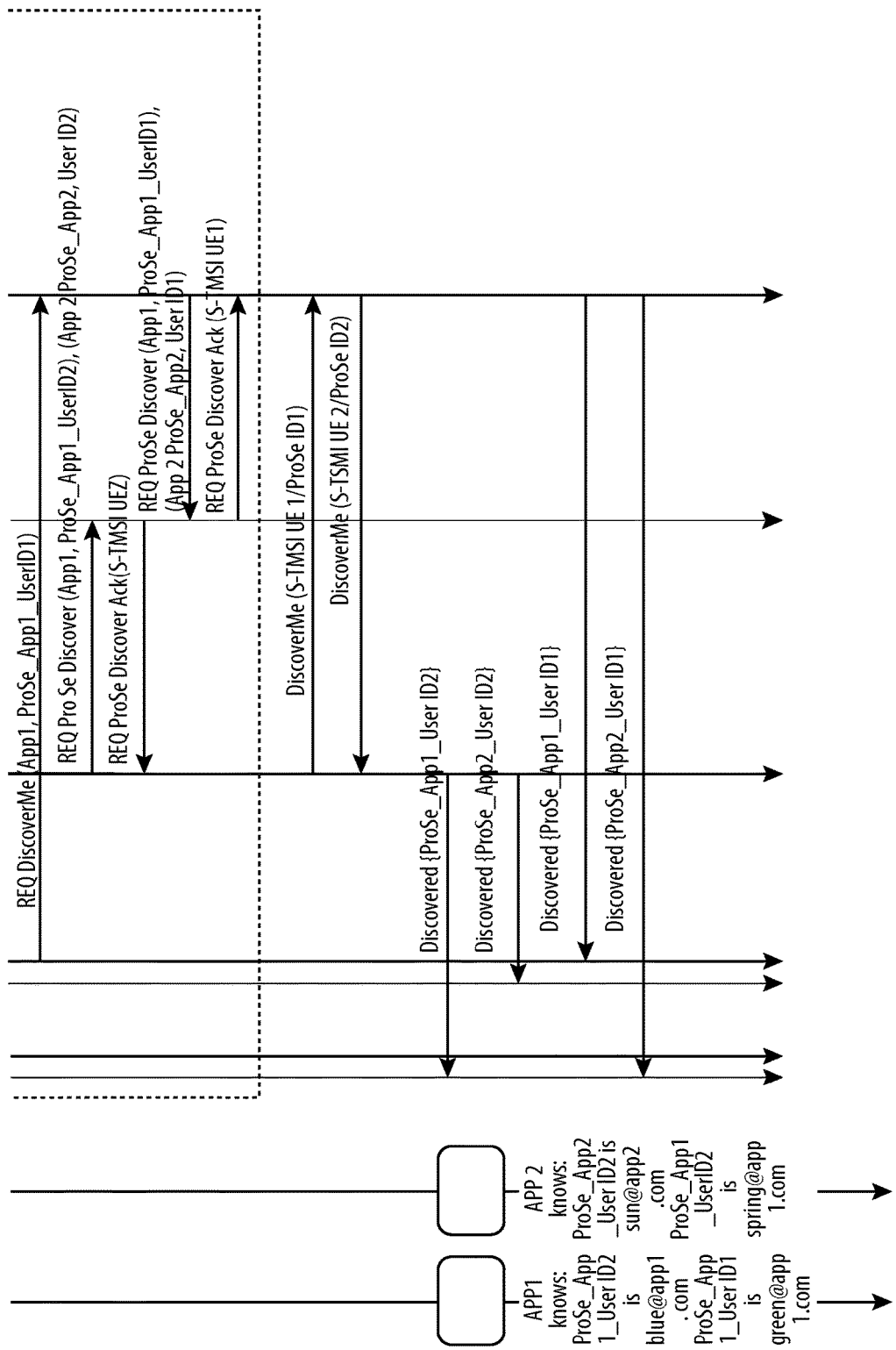
Figure 10:
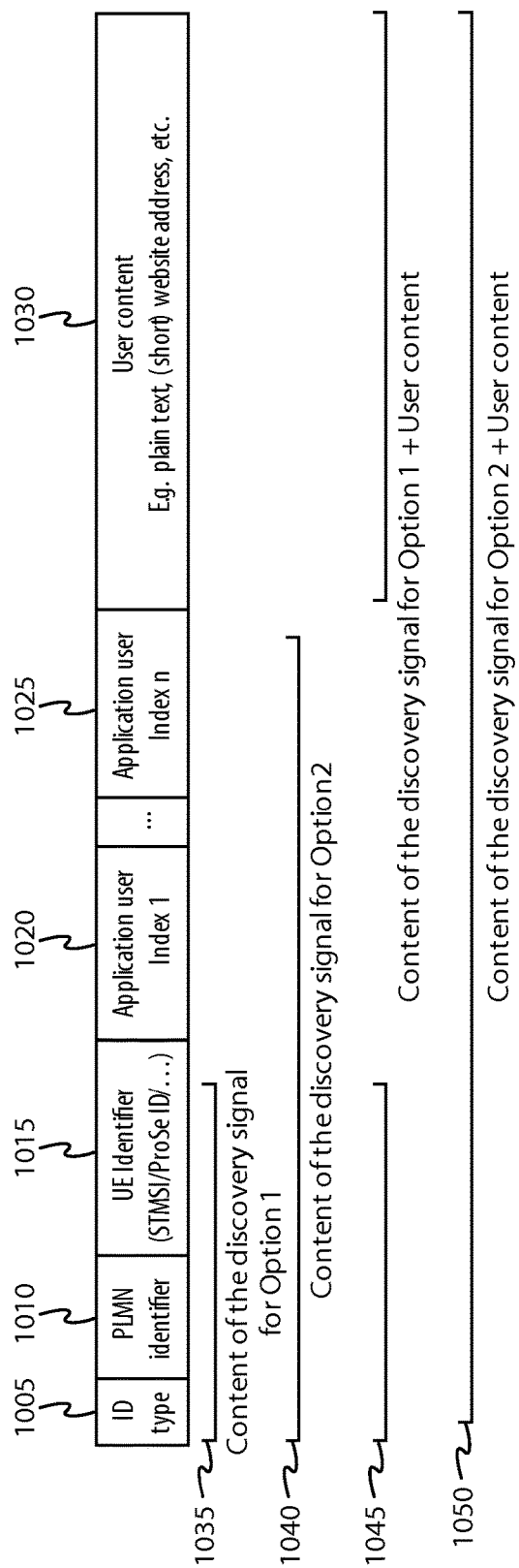

FIG. 4A is an example diagram showing a layered approach that may be taken where Application ProSe Discovery may be utilized upon Radio ProSe Discovery in accordance with an embodiment of the present invention;

FIG. 4B shows an example diagram of restrictions and permissions for discoverability in accordance with an embodiment of the present invention;

FIG. 5 is an exemplary diagram of a ProSe Server showing one possible organization structure, in accordance with an embodiment of the present invention;

FIG. 6A is an example flowchart illustrating a method of operating an example apparatus in accordance with an embodiment of the present invention;

FIG. 6B is a diagram showing a method of operating an example apparatus in accordance with an embodiment of the present invention;

FIG. 7 is a diagram showing a method of operating an example apparatus in accordance with an embodiment of the present invention;

FIG. 8 is a diagram showing a method of operating an example apparatus in accordance with an embodiment of the present invention;

FIG. 9A is a diagram showing a method of operating an example apparatus in accordance with an embodiment of the present invention;

FIG. 9B is a diagram showing a method of operating an example apparatus in accordance with an embodiment of the present invention; and FIG. 10 is an exemplary embodiment of a discovery signal in accordance with an embodiment of the present invention.

DETAILED DESCRIPTION

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored.

Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

A method, apparatus and computer program product are provided in accordance with an example embodiment of the present invention in order to allow discovery of UEs and application users in proximity of each other, using direct radio signals exchanged between UEs on a common discovery channel, while trying to limit the amount of signaling on this channel, without jeopardizing the confidentiality and privacy of the permanent identities of the UE in the EPS (such as IMSI, IMEI) and of the Application user identity.

Referring now to FIG. 1, which illustrates an example system that supports communications between a plurality of stations 10 and one or more access points 12, each access point may communicate with one or more stations and, in one embodiment, may communicate with a large number of stations, such as 6,000 or more stations. The access points may, in turn, communicate with a network 14. While the access points may communicate via an Long Term Evolution (LTE) or LTE-Advanced (LTE-A) network, other networks may support communications between the access points including those configured in accordance with wideband code division multiple access (W-CDMA), CDMA2000, global system for mobile communications (GSM), general packet radio service (GPRS), the IEEE 802.11 standard including, for example, the IEEE 802.11 ah or 802.11ac standard or other newer amendments of the standard, wireless local access network (WLAN), Worldwide Interoperability for Microwave Access (WiMAX) protocols, universal mobile telecommunications systems (UNITS) terrestrial radio access network (UTRAN) and/or the like.

The access points 12 and the stations 10 may communicate via wireline communications, but most commonly communicate via wireless communications. For example, the access points and the stations may communicate in a sub 1 GHz band as defined by IEEE 802.11ah standard or in a 5 GHz band, which may be defined by, for example, IEEE 802.11ac standard. The access point may be embodied by any of a variety of network entities, such as an access point, a base station, a Node B, an evolved Node B (eNB), a radio network controller (RNC), a mobile device (e.g., mobile telephones, smart phones, portable digital assistants (PDAs), pagers, laptop computers, tablet computers or any of numerous other hand held or portable communication devices, computation devices, content generation devices, content consumption devices, or combinations thereof), or the like. The stations may also be embodied by a variety of devices, such as sensors, meters or the like. The sensors and meters may be deployed in a variety of different applications including in utility applications to serve as a gas meter, a water meter, a power meter or the like, in environmental and/or agricultural monitoring applications, in industrial process automation applications, in healthcare and fitness applications, in building automation and control applications and/or in temperature sensing applications. Stations that are embodied by sensors or meters may be utilized in some embodiments to backhaul sensor and meter data. Alternatively, the stations may be embodied by mobile terminals or user equipment(s) (UE), such as mobile communication devices, e.g., mobile telephones, smart phones, portable digital assistants (PDAs), pagers, laptop computers, tablet computers or any of numerous other hand held or portable communication devices, computation devices, content generation devices, content consumption devices, or combinations thereof. In an embodiment in which the station is embodied by a mobile terminal, the communication between an access point and the station may serve to extend the range of wi-fi or another wireless local area network (WLAN), such as by extending the range of a hotspot, and to offload traffic that otherwise would be carried by a cellular or other network.

The access point 12 and/or the station 10 may be embodied as or otherwise include an apparatus 20 that is specifically configured to perform the functions of the respective device, as generically represented by the block diagram of FIG. 2. While the apparatus may be employed, for example, by an access point or a station, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with processing circuitry 22 that is configurable to perform actions in accordance with example embodiments described herein. The processing circuitry may be configured to perform data processing, application execution, signal processing, measurements and report generation, and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein. Alternatively or additionally, a processing system may be embodied by or have similar functionality to the processing circuitry.

In an example embodiment, the processing circuitry 22 may include a processor 24 and memory 26 that may be in communication with or otherwise control a communication interface 28 and, in some cases, a user interface 30. As such, the processing circuitry may be embodied as a circuit chip (e.g., an integrated circuit chip) configured (e.g., with hardware, software or a combination of hardware and software) to perform operations described herein. However, in some embodiments, the processing circuitry may be embodied as a portion of the mobile terminal 10.

The user interface 30 (if implemented) may be in communication with the processing circuitry 22 to receive an indication of a user input at the user interface and/or to provide an audible, visual, mechanical or other output to the user. In this regard, the user interface and/or the processing circuitry 22 may include user interface circuitry configured to facilitate user control of at least some functions based upon user input. The user interface may include, for example, a keyboard, a mouse, a trackball, a display, a touch screen, a microphone, a speaker, and/or other input/output mechanisms. The apparatus 20 need not always include a user interface.

The communication interface 28 may include one or more interface mechanisms for enabling communication with other devices and/or networks, such as for enabling communication between an access point 12 and a station 10 or between two or more stations. In some cases, the communication interface may be any means such as a device or circuitry embodied in either hardware, or a combination of hardware and software that is configured to receive and/or transmit data from/to a network and/or any other device or module in communication with the processing circuitry 22. In this regard, the communication interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 26 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory may be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an application specific integrated circuit (ASIC), an field programmable gate array (FPGA), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

A method, apparatus and computer program product are provided in accordance with an example embodiment of the present invention in order to discover devices, applications, and application users. Furthermore, a method, apparatus and computer program product are provided in accordance with an example embodiment of the present invention in order to provide for the discovery of UEs and Application users in a proximity of each other, using signals exchanged between UEs on a channel, while limiting the amount of signaling on this channel. The method, apparatus and computer program product may provide for the discovery without jeopardizing the confidentiality and privacy of the permanent identities of the UE and of the Application user identity.

In one example embodiment, an exemplary method may utilize one or more UE identifiers that may be (a) pre-configured in the UE; or (b) assigned by the network (S-TMSI); or (c) assigned by a ProSe server (ProSe ID). The ProSe server may be a part of the network. The UE identifier (e.g., Subscriber ID or ProSe ID shown in FIG. 5) may belong to one of a public or private address space, while an application level identifier (e.g., App ID shown in FIG. 5) can generally allow a network and a UE to identify a given application. In one embodiment, the network could verify whether a given request is from an authorized application. Some digital signature may be necessary. That could be linked to the application level identifier App_ID for instance, or be the application level identifier App_ID itself The format thereof can (should) be specified by 3GPP. A ProSe application user identifier ProSe_App_User_ID, which is one of the application level identifiers, may allow identification of a specific Application user in a given Application (e.g., a proximity service application) without disclosure of the identity of said Application user outside this application. The ProSe application user identifier ProSe_App_User_ID may be assigned by the given Application using an Application layer mechanism. The Application may be a third-party application of which execution or operation is requested by a third party, not a user. The ProSe_App_User_ID could be assigned by a ProSe server. A ProSe server can store, for one or more associated UEs, various information including: the UE identifier of said UE; and/or the list of application level ID combinations {App ID; ProSe_App_User_ID} of the UE, possibly with a different index assigned to each of the application level ID combinations {App ID; ProSe_App_User_ID}. The UE, associated with the ProSe server, can store, for corresponding one of the user's purposes or interests, various information including: the UE's identifier, possibly fetched from the ProSe server; and a list of one or more application level ID combinations {App ID; ProSe_App_User_ID}, possibly fetched from the ProSe server; and selectively or alternatively, the index for each of the application level ID combinations {App ID; ProSe_App_User_ID}, possibly fetched from said the associated ProSe server. The ProSe server can include the UE identifier only; or alternatively, the UE identifier and a list of indices of one or more application level ID combinations {App ID; ProSe_App_User_ID} for each associated UE where the list could be defined per a discovery range class such that all UEs in the list belong/use the same discovery range class. Further, as another enhancement way, the list could be determined by adding user's content which is in the form of plain text, (short) web address, etc. A discovery process in the UE and/or the ProSe server (or the network) can identify a given UE in proximity and/or an Application user in proximity, based on the UE identifier of said given UE; (b) the application level identifier App ID, i.e., one of the application level ID combinations {App ID; ProSe_App_User_ID}, for said given UE to identify the Application executed or operated on said given UE; and (c) the prose application user identifier ProSe_App_User_ID in said application to identify the Application user in proximity.

As such, the method, apparatus and computer program product of an example embodiment may provide means for radio discovery of UEs and application level discovery of application users, based on: UE identifiers (one per UE), internal to the 3GPP system. The UE identifier assigned to each UE may belong to one of a public or private address space. The prose application user identifiers (called ProSe_App_User_ID) allow to identify ProSe Application users in ProSe Application without disclosure of the identity of ProSe Application user outside the ProSe application. The prose application user identifier ProSe_App_User_ID can provide users' identification information applicable to the ProSe application, not other applications generally operable on UEs. Signaling between UEs and a ProSe server may be required to enable discoverability and discovery of UEs and Application users through associated functions in the ProSe server and in the UE. A ProSe Discovery generally means process that identifies that a UE is in proximity of another, using E-UTRA. There are two types of ProSe discovery: one is an open ProSe discovery which discovers other UEs without explicit permission from the discovered UEs; the other is a restricted ProSe discovery which only takes place with explicit permission from the UE being discovered. Application level restrictions such that a first application level ID blue@app can only be discovered by a second or third application level ID red@app, white@app may be enforced at the application level. A ProSe server may store, for each UE, the identity of the UE and associated identifiers of applications and application users for this UE. A discovering UE may query the ProSe server to retrieve this information, based on a request from the application. The discovering UE may then monitor the discovery channel for discovery signals including the UE identity that was retrieved, and optionally, additional information that may allow the UE to determine the Application identity and associated application user.

Possible or plausible situations can be assumed as follows: first, the same application may be used across different UEs (i.e. devices) by the same Application user (i.e., a single user can execute the same application on different wireless devices); second, different application users may use the same device (UE) (i.e., a single wireless device can be used by one or more users). If several users share the same device with each other, the Application user identity which is assignable to each operated application per each user should not be visible within the 3GPP domain (EPS) (not only in order to respect privacy, but also and importantly to ensure that privacy terms at the application are able to be enforced by the application itself). When the Application user identity is hidden from other users in the 3GPP domain, a third party application provider can remain solely liable for enforcing the privacy terms of its application. When multiple users use or operate the same application on the same or different wireless devices, the discovery process eventually conveys application layer information in a particular form from one application instance to another application instance to enable each application instances to access each other by use of ProSe UE Discovery. For the way of example but not limitation, an application may be a social network application operable for a mobile operating system such as iOS, Android, etc.; and an application instance would then be execution or run of such social network application on a given wireless device having a mobile operation system such as iOS, Android, etc. A ProSe entity in the network provides functions required to support ProSe operation (hereinafter, referred as to a "ProSe Server").

FIGS. 3, 4A, 4B, 6A, 6B, 7, 8, and 9 illustrate an example flowchart of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 3, 4A, 4B, 6A, 6B, 7, 8, and 9, when executed, convert a computer or processing circuitry into a particular machine configured to perform an example embodiment of the present invention. Accordingly, the operations of FIGS. 3, 4A, 4B, 6A, 6B, 7, 8, and 9 define an algorithm for configuring a computer or processing to perform an example embodiment. In some cases, a general purpose computer may be provided with an instance of the processor which performs the algorithms of FIGS. 3, 4A, 4B, 6A, 6B, 7, 8, and 9 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations above either alone or in combination with any others among the features described herein.

Referring now to FIG. 3, the operations performed by an apparatus 20, such as illustrated in FIG. 2, embodied by a computing device 10 are illustrated and will be hereinafter described. FIG. 3 is an example flowchart illustrating a method for discovering devices and application users in accordance with an embodiment of the present invention.

Referring now to block 305 of FIG. 3, the apparatus may include means, such as the processing circuitry 22, the processor 24, the communication interface 28 or the like, for receiving a discovery request from an application (e.g., an application registered with a server and thus enabled for ProSe Discovery and/or communication) having a first application level ID and stored on a first device, the request including at least second application level ID. In one embodiment, the application receives the second application level ID, which may be associated with a second application user, from an application server as related to an application user that has permitted the application to discover it.

Referring now to block 310 of FIG. 3, the apparatus may include means, such as the processing circuitry 22, the processor 24, the communication interface 28 or the like, for, upon receiving the discovery request, providing a server (e.g., a ProSe server) with a request for a UE ID associated with the second application level ID. In one embodiment, the apparatus may have already come to possess the UE ID and need not provide a request for such information to the ProSe server.

Referring now to block 315 of FIG. 3, the apparatus may include means, such as the processing circuitry 22, the processor 24, the communication interface 28 or the like, for receiving a UE ID identifying a second device, on which a second ProSe enabled application is stored. In one embodiment, the apparatus also receives a corresponding index value. The index value indicative of a state of the device and whether the application user has provided a request to be discovered.

Referring now to block 320 of FIG. 3, the apparatus may include means, such as the processing circuitry 22, the processor 24, the communication interface 28 or the like, for causing monitoring of a discovery channel for an occurrence of the UE ID. In one embodiment, the apparatus is configured for causing the monitoring of the discovery channel for both the UE ID and the corresponding index value. In one embodiment, the apparatus may receive a discovery signal. The apparatus may then be configured for determining if a record exists in memory for the UE ID and optionally, the corresponding index value.

Referring now to block 325 of FIG. 3, the apparatus may include means, such as the processing circuitry 22, the processor 24, the communication interface 28 or the like, for, upon discovery, providing an indication to the application of the discovery of the device for which the second application level ID was requested.

Referring now to block 330 of FIG. 3, the apparatus may include means, such as the processing circuitry 22, the processor 24, the communication interface 28 or the like, for providing notification to user associated with the apparatus, the application, or the like of the proximity of the user associated with the second device, the second application level ID or the like.

In general, ProSe UE Discovery can be divided into two levels. FIG. 4A is an illustration showing an exemplary process for discovery using the two levels. The first level is related to radio (3GPP) discovery of ProSe devices (UEs). Here, a device may discover other ProSe devices in proximity based on ProSe-provided information of indicating whether those other ProSe devices are ON and enabled/allowed to be accessed. Discovery signaling may be performed by operator's control, and/or may be performed periodically. The second level is related to application discovery of Application users who operate a particular application on their ProSe devices located in proximity to each other. Here, each application utilizes proximity services (ProSe) can receive and handle an indication of the same application executed in other UEs discovered by the UE through radio discovery. The application has a role to identify the Application users in the proximity based on information from discovered devices in the proximity.

A layered approach may be taken where Application ProSe Discovery may be utilizing Radio ProSe Discovery, as shown in FIG. 4A. The radio (3GPP) level discovery may be based at least on a UE identifier, such as for example S-Temporary Mobile Subscriber Identity (S-TMSI). The S-TMSI identifies a mobile device within a given Mobility Management Entity (MME). A 3GPP level UE identifier (a Non-Access-Stratum (NAS) level) may be assigned for the UE in a relatively static manner whilst protecting the permanent identities of the UE and subscriber in the EPS. A new identifier ProSe ID, for the way of example but not limitation, may also be assigned. This 3GPP level UE identifier ProSe ID may later be used for addressing a UE in Radio ProSe Discovery and possible ProSe Communication establishment either by an Evolved Packet Core (EPC) executing the establishment between two UEs, or also directly between the two UEs. That is, the 3GPP level UE identifier ProSe ID enables the ProSe Communication between two different UEs in proximity by means of a communication path established between the UEs. Direct ProSe communication between the UEs or the ProSe communication path routed via a local network eNB is feasible.

The UE identifier for radio level ProSe discovery may belong to one of a public address space, or private address space. The network operator may define address spaces accordingly. Some default public UE identifiers may be configured by the operator (and made available in the memory 26 such as USIM/UICC set by the operator, for example) according to categories, such as hospitals, police, or the like that may be immediately identifiable as such.

The system may allow the use of several types of UE identifiers. In such a case, the type of UE identifier ID Type can be indicated as an additional information alongside the UE identifier for radio level ProSe discovery.

For the way of example but not limitation, the identification of the PLMN to which a UE is registered can be used for radio level ProSe discovery, such that a receiving UE can detect the PLMN of other discoverable UEs. The UE identifier for radio level ProSe discovery may be defined such that it could intrinsically distinguish the PLMN, or alternatively, a separate PLMN identifier may be used alongside the UE identifier.

Regarding application level discovery, a ProSe application user identifier ProSe_App_user_ID which may allow identification of the user within an application using a proximate service ProSe is introduced. An application user identifier may provide a one-to-one mapping with an Application user within a certain application without disclosure of the Application user identity like, by the way of example but not limitation, a form of user@app.com to the 3GPP system or other application systems, thus preserving privacy. If an application executed on UE does not use a proximate service ProSe, it is not required that the application user identifier for that application discloses the Application user identity to the ProSe server/system. The ProSe application user identifier ProSe_App_user_ID may be unique per an application using a proximate service and known to a ProSe Server and an Application Server for that application. The ProSe application user identifier ProSe_App_User_ID may be defined at the application executed on user's UE, by an application level mechanism, and exchanged between application instances using application level mechanisms, such that other Application users operating the same application can get hold of the relevant information like the ProSe application user identifier ProSe_App_User_ID which is transmitted to other users' UEs for contacts between the user and other users. Alternatively, the ProSe application user identifier ProSe_App_user_ID could be defined by the 3GPP system or the ProSe system.

Restrictions and permissions for discoverability may be set and enforced at the application level and at the 3GPP (ProSe) level respectively, as illustrated in FIG. 4B.

FIG. 5 shows a ProSe server. The ProSe Server may be an entity in the EPC configured for supporting the ProSe operation. For the discovery process, the ProSe server may store one or more entries per each authorized subscriber and ProSe UE pair. FIG. 5 shows possible organization of the IDs. As one skilled the art would readily appreciate, other organizations are possible.

Note that in the following, the notation "S-TMSI/ProSe ID" means S-TMSI or ProSe ID, consistently, such that all notations refer to S-TMSI or all notations refer to ProSe ID.

Referring now to FIG. 6A, the operations performed by an apparatus 20, such as illustrated in FIG. 2, embodied by a computing device 10 are illustrated and will be hereinafter described. FIG. 6A is an example flowchart illustrating a method for registering a device and an application with a ProSe server, in accordance with an embodiment of the present invention.

Referring now to block 605 of FIG. 6A, the apparatus may include means, such as the processing circuitry 22, the processor 24, the communication interface 28 or the like, for registering with a ProSe server by providing an UE identifier.

Referring now to block 610 of FIG. 6A, the apparatus may include means, such as the processing circuitry 22, the processor 24, the communication interface 28 or the like, for receiving acknowledgment from the ProSe server, the acknowledgment including an assigned ID for use for discovery or a S-TSMI.

Referring now to block 615 of FIG. 6A, the apparatus may include means, such as the processing circuitry 22, the processor 24, the communication interface 28 or the like, for causing an indication to one or more ProSe enabled applications that the apparatus is ProSe enabled.

Referring now to block 620 of FIG. 6A, the apparatus may include means, such as the processing circuitry 22, the processor 24, the communication interface 28 or the like, for receiving a request from a ProSe enabled application requesting that the application be discoverable, the request including a user ID.

Referring now to block 625 of FIG. 6A, the apparatus may include means, such as the processing circuitry 22, the processor 24, the communication interface 28 or the like, for providing the request from the application to the ProSe server, including an App ID and a user ID.

Referring now to block 630 of FIG. 6A, the apparatus may include means, such as the processing circuitry 22, the processor 24, the communication interface 28 or the like, for receiving an acknowledgment from the ProSe server or an indication of the entry index corresponding to the Application level ID and user ID.

Referring now to 6B, the operations performed by an apparatus 20, such as illustrated in FIG. 2, embodied by a computing device 10 are illustrated and will be hereinafter described.

Referring now to step 1, the UE registers with the ProSe server indicating its UE identifier, for example as shown, its S-TMSI (S-TMSI1). Note that for out-of-coverage operation, this registration step does not take place; the UE may be implicitly authorized and configured to use ProSe. In this case, the UE is also pre-configured, e.g., by a manufacturer or a network operator, with a dedicated UE identity.

Referring now to step 2a, the ProSe server may determine that the UE is authorized for ProSe and acknowledges the registration to the UE. If a ProSe ID is assigned (optional) for use for discovery (e.g., instead of S-TMSI) then it may be indicated in the acknowledgement to the UE. The acknowledgement may include the S-TMSI as a confirmation to the UE.

Referring now to step 2b, the ProSe server determines that the UE is not authorized for ProSe and negatively acknowledges the registration, possibly indicating the cause thereof to the UE.

As a result of step 2a, the UE may now be allowed to use ProSe and may be discoverable (radio discovery) and proceeds to Step 3. As a result of step 2b, the UE may not allowed to use ProSe, and does not proceed to Step 3.

Referring now to step 3, the UE may indicate to ProSe-enabled applications that the UE is allowed to use ProSe. Active ProSe-enabled applications may use the assigned ProSe application user identifier ProSe_App_User_ID or activate an already assigned/configured ProSe application user identifier ProSe_App_User_ID. Here, "assignment" may refer to an application server providing the ProSe application user identifier ProSe_App_User_ID to an application instance for a given Application user and "configuration" may refer to a ProSe application user identifier ProSe_App_User_ID readily available at the application, for example, without preliminary communication with an application server.

Referring now to step 4, the application requests that its Application user be ProSe discoverable by indicating the ProSe_App_User_ID to the UE. The application may also include the App ID. Alternatively, the UE may determine the appropriate App ID (if App IDs are "owned" by the user/operator).

Referring now to step 5, the UE may forward the request from the application to the ProSe server, including its S-TMSI (or ProSe ID), the application level identifier App ID and the related ProSe application user identifier ProSe_App-User_ID. In one embodiment, one or more requests from several applications may be aggregated into a single request to the ProSe server, in which case the UE then indicates, for each application, an application level ID combination of the App ID and ProSe_App_User_ID.

Referring now to step 6a, the ProSe server may determine using the received App ID that the application is authorized to use ProSe. The ProSe server may create an entry for this UE, storing the received application level ID combination of App ID and ProSe-App_User_ID. The ProSe server may then acknowledge the request to be discoverable to the UE. Thereafter, the network may be able to verify that a given request is from an authorized application. In some embodiment, some digital signature may be necessary (this could be linked to the App_ID for instance, or be the App_ID). The format thereof may be specified by 3GPP.

Referring now to step 6b, the ProSe server may determine using the received application level identifier App ID that the currently executed application is not authorized to use ProSe. The ProSe server may negatively acknowledge to the UE, the request from the application to be discoverable. In an embodiment in which the UE sent the aggregate request in step 5, the ProSe Server may send an aggregated response indicating per requested application whether the request from the UE is accepted or not.

Referring now to step 7a, the UE may forward the response from the ProSe server to the application. Upon step 7a, the application (server) thereafter exchanges the ProSe application user identifier ProSe_App_User_ID of the application user with other application users as per restrictions and/or permissions set at the application by the application user.

The application user is now discoverable to other application users executing the same application using ProSe, according to the restrictions enforced at the application.

Referring now to 7, the operations performed by an apparatus 20, such as illustrated in FIG. 2, embodied by a computing device 10 are illustrated and will be hereinafter described. FIG. 7 shows a diagram of a first process (e.g., option 1) where discovery may be made utilizing S-TSMI/ProSe ID.

FIG. 7 may assume that first and second mobile devices UE1 and UE2 are successfully registered to the ProSe Server. At a first application App 1, a second user 'blue' on the first application 'app1' (i.e., blue@app1) allows a first user 'green' on the same application 'app1' (i.e., green@app1) to discover the first user 'blue' on the first application 'app1'; and a second user's ProSe application user identifier ProSe_App_User_ID2 is made available to the first application App1 in the first mobile device ProSe UE1 (i.e., the first user). Likewise, at the first application App 1, the first user 'green' on the first application 'app1' (i.e., green@app1) permits the second user 'blue' on the first application 'app1' (i.e., blue@app1) to discover the first user 'green' on the first application 'app1'; and a first user's ProSe application user identifier ProSe_App_User_ID1 is made available to the first application App1 in the second mobile device ProSe UE2 (i.e., the second user). The ProSe server holds a record for a first user's S-Temporary Mobile Subscriber Identity S-TMSI1 associated with a first user's application level ID combination {App ID1, ProSe_App_User_ID1} and for a second user's S-TMSI2 associated with a second user's application level ID combination {App ID2, ProSe_App_User_ID2}.

Referring now to step 1a, given the permission above, the first application App 1 on the first mobile device UE1 requests the first mobile device UE1 to be able to discover the second user's ProSe application user identifier ProSe_App_User_ID2 by means of the ProSe sever.

Referring now to step 2a, upon reception of a discovery request REQ_Discover from the first application App1, the first mobile device UE1 may determine whether the first mobile device UE1 holds no UE identity record about the second user's ProSe application user identifier regarding the first application (i.e., the second user's application level ID combination {App ID1; ProSe_App_User_ID2}), and then, the first mobile device UE1 transmit its discovery request for looking for the second user's application level ID combination to the ProSe Server.

Referring now to step 3a, the ProSe server retrieves the second user's S-TMSI2 (and/or ProSe ID2) based on the information {App ID1; ProSe_App_User_ID2} requested by the first mobile device UE1 and sends back the second user's S-TMSI2 (and/or ProSe ID2) to the first mobile device UE1 which can record of the second user's S-TMSI2 (and/or ProSe ID2) with the second user's application level ID combination of {App ID1; ProSe_App_User_ID2}.

The first mobile device UE1 may now be able to discover the proximity of the second user's application level ID combination {App ID1; ProSe_App_User_ID2} by monitoring the occurrence of the second user's S-TMSI2 (or ProSe ID2) on the discovery channel. Following similar steps, the second mobile device UE2 may also be able to discover the proximity of the first user's application level ID combination {App ID1; ProSe_App_User-ID1} by monitoring the occurrence of the first user's S-TMSI1 (or ProSe ID1) on the discovery channel.

Referring now to step 4a, the first application 'app1' operated by the second user 'blue' (i.e., blue@app1) requests the second mobile device UE2 to be disclosed by the first mobile device UE1 through the second user's S-TMSI2 (or ProSe ID2). The first application 'App1' executed on the second mobile device UE2 issues the ProSe_App_User_ID2 corresponding to the user identity blue@app 1.

Referring now to step 4b, upon receipt of the discovery request REQ_DiscoverMe from the first application App1, the second mobile device UE2 sends its DiscoverMe signal on the discovery channel, indicating its S-TMSI2/ProSe ID2.

Referring now to step 5, the first mobile device UE1 receives the discovery signal DiscoverMe including S-TMSI2/ProSe ID2. The first mobile device UE1 determines whether the first mobile device UE1 holds a record for S-TMSI2/ProSe ID2, namely the second user's application level ID combination {App ID1; ProSe_App_User_ID2}. The first mobile device UE1 then notifies the first application App1 (App ID1) that the first application App1 executed on the first mobile device has discovered ProSe_App_User_ID2. Note that the first mobile device UE1 could hold a set of several records for S-TMSI2/ProSe ID2 (i.e., a multiple records regarding the second user's application level ID combination {App IDx; ProSe_App_User IDy}. In this case, upon detecting S-TMSI2/ProSe ID2 in a discovery signal, the first mobile device UE1 notifies each of all applications identified in the record that each application has discovered the corresponding ProSe_App_User_ID.

The first application App1 operated on the first mobile device UE1 identifies the second user's ProSe application user identifier ProSe_App_User_ID2 corresponding to the second user's identity blue@app1. The first user's identity Green@app1 is thereafter notified of the proximity of the second user's identity blue@app1.

Referring now to 8, the operations performed by an apparatus 20, such as illustrated in FIG. 2, embodied by a computing device 10 are illustrated and will be hereinafter described.

FIG. 8 shows a diagram of a second process (e.g., option 2) where discovery may be made. Here, this discovery method may utilize S-TSMI/ProSe ID with an Application User Index.

First and second mobile devices UE1 and UE2 are successfully registered to the ProSe Server. Regarding restrictions/permission at the first application App1, a second user 'blue' on the first application (i.e., blue@app1) permits a first user 'green' on the first application (i.e., green@app1) to discover the second user 'blue'; and a second user's ProSe application user identifier ProSe_App_User_ID2 is made available to the first application App1 operated in the first mobile device ProSe UE1. Likewise, at the first application App1, the first user 'green' on the first application (i.e., green@app1) permits the second user 'blue' on the first application (i.e., blue@app1) to discover the first user 'green'; and a first user's ProSe application user identifier ProSe_App_User_ID1 is made available to the first application App1 operated in the second mobile device ProSe UE2. The ProSe server holds a record for the first user's S-TMSI1 (or ProSe ID1) showing the first user's application level ID combination {App ID1, ProSe_App_User_ID1} and for the second user's S-TMSI2 (or ProSe ID2) indicating the second user's application level ID combination {App ID2, ProSe_App_User_ID2}.

Referring now to step 1 a, given the permission above, the first application App1 on the first mobile device UE1 requests the first mobile device UE1 to discover a second user's ProSe application user identifier ProSe_App_User_ID2 by means of a ProSe server or system.

Referring now to step 2a, upon reception of the discovery request REQ_Discover from the first application App1, the first mobile device UE1 determines whether the first mobile device UE1 holds no other UE identity record (nor App ID record for the first mobile device UE1) for finding the corresponding of the second user's application level ID combination {App ID 1; ProSe_App_User_ID2} and then the first mobile device UE1 transmit its discovery request for looking for the second user's application level ID combination to the ProSe Server.

Referring now to step 3a, the ProSe server retrieves the second user's S-TMSI2 (and/or ProSe ID2) based on the information {App ID1; ProSe_App_User_ID2} requested by the first mobile device UE1, as well as the application user index ("1") of {App ID1; ProSe_App_User_ID2} for S-TMSI2. The ProSe server responds back to the first mobile device UE1, indicating the second user's S-TMSI2 and the application user index "1", which stores a corresponding entry of the second user's S-TMSI2 with the second user's application level ID combination {App ID1; ProSe_App_User_ID2} under the application user index "1".

The first mobile device UE1 may now be able to discover the proximity specifically of the second user's application level ID combination {App ID1; ProSe_App_User_ID2} by monitoring the occurrence of the second user's S-TMSI2 (or ProSe ID2) together with the application user index "1" on the discovery channel. Following similar steps, the second mobile device UE2 is also able to discover the proximity of the first user's application level ID combination {App ID1; ProSe_App_User ID1} by monitoring the occurrence of the first user's S-TMSI1 (or ProSe ID1) together with the application user index "1" on the discovery channel.

Referring now to step 4a, the first application 'app1' operated by the second user 'blue' (i.e., blue@app1) requests the second mobile device UE2 to be disclosed by the first mobile device UE1 through the second user's S-TMSI2 (or ProSe ID2). The first application 'App1' on the second mobile device UE2 issues the ProSe_App_User_ID2 corresponding to the user identity blue@app1.

Referring now to step 4b, upon receipt of the discovery request REQ_DiscoverMe from the first application App1, the second mobile device UE2 sends its DiscoverMe signal on the discovery channel, indicating its S-TMSI2/ProSe ID as well as the application user index value ("1") corresponding to the second user's application level ID combination {App ID1, ProSe_App_User_ID2}.

Referring now to step 5, the first mobile device UE1 may receive the discovery signal DiscoverMe containing S-TMSI2 (or ProSe ID2) and the application user index value "1". The first mobile device UE1 may determine that the first mobile device UE1 holds a record for the second user's S-TMSI2/ProSe ID2, and whether the application user index value received ("1") matches a recorded index of the second user's S-TMSI2 which are recorded in the first mobile device UE1. Matching the S-TMSI/ProSe ID and the application index value, the first mobile device UE1 retrieves the record about the second user's application level ID combination {App ID1, ProSe_App_User_ID2}. The first mobile device UE1 then notifies the first application App1 (App ID1) that the first application App 1 has discovered the second user's ProSe application user identifier ProSe_App_User_ID2.

The first application App1 operated on the first mobile device UE1 identifies the second user's ProSe application user identifier ProSe_App_User_ID2 corresponding to the second user's identity blue@app1. The first user's identity Green@app1 is thereafter notified of the proximity of the second user's identity blue@app1.

FIG. 9 shows an example of the registration & discoverability process (as shown in FIGS. 6A and 6B) and discovery (as shown in FIG. 7) when two applications are involved. As shown, first and second mobile devices UE1 and UE2 are successfully registered to the ProSe Server. At a first application App1, a second user on the first application (i.e., blue@app1) permits a first user on the first application (i.e., green@app1) to discover the second user; and the second user's ProSe application user identifier ProSe_App_User_ID2 is made available to the first application App1 operated in the first mobile device ProSe UE1. At the first application App1, the first user on the first application (i.e., green@app1) permits the second user on the first application (i.e., blue@app1) to discover the first user; and the first user's ProSe application user identifier ProSe_App_User_ID1 is made available to the first application App1 operated in the second mobile device ProSe UE2. At a second application App2, a third user on the second application (i.e., spring@app2) permits a fourth user on the second application (i.e., sun@app2) to discover the third user. At the second application App2, the fourth user on the second application (i.e., sun@app2) permits the third user on the second application (i.e., spring@app2) to discover the fourth user. Herein, the first user 'green' and the third user 'spring' shares the first mobile device UE1, while the second user 'blue and the fourth user 'sun' shares the second mobile device UE2. FIG. 9 then shows a discoverability procedure including authorization and registration. Once the ProSe server provides acknowledgements to the first and second mobile devices UE1 and UE2, a discovery process is shown. The discovery process provides for discovering users at the application level.

After the discovery process, the first mobile device UE1 may be able to discover the proximity specifically of {App ID1; ProSe_App1_User_ID2} and {App ID2; ProSe_App2_User_ID2} by monitoring the occurrence of S-TMSI2 (or ProSe ID2) on the discovery channel. Following similar steps, the second mobile device UE2 is also able to discover the proximity of {App ID1; ProSe_App1_User ID1} and {App ID2; ProSe_App2_User_ID1} by monitoring the occurrence of S-TMSI1 (or ProSe ID1) discovery channel.

As shown, the first application App1 knows that ProSe_App1_UserID2 includes the second user identity blue@app1.com and ProSe_App2_UserID1 shows the first user identity green@app1.com. The second application App2 knows that ProSe_App2_UserId2 indicates the fourth user identity sun@app2.com and ProSe_App2_UserID1 shows the third user identity spring@app2.com.

Accommodation of Discovery Range Class

An application may request to use a range class for discovery (subject to operator authorization). N range classes may be defined from shortest to longest. N is an integer.

By the way of example but not limitation, the range class may be determined as follows:

In Option 1, a discovery signal from a given UE (S-TMSI/ProSe ID) only contains the identifier of the UE, no per-Application data. The receiving UE may not distinguish a particular application from a received discovery signal. This may imply that the range class used when transmitting a given discovery signal eventually applies to all Applications operated on that UE. If one of two active applications requires a short range and the other requires a long range, for effective operation, a range class is determined for the two active applications whenever a discovery signal is sent from that UE.

In Option 2, a discovery signal from a given UE (S-TMSI/ProSe ID) may contain the indices for one or more application level ID combination {App ID; ProSe_App_User_ID}. A discovery signal may include the indices which are determined by some active applications requesting the same range class "R". Additionally, the discovery signal could contain indices from another application requesting a higher range class than the range class "R", but it shall not contain indices from another application requesting a lower range class than the range class "R".

Communication Phase

Once a UE has discovered another UE, and enabled application level discovery, the application may require the establishment of a communication channel between the two Application users. In this case, the UE identifiers (S-TMSI/ProSe ID) may be used to identify the two UE end-points of the communication channel and establish the communication channel, either directly between the two UEs without involving the network, or involving the network (e.g. notifying the eNB of the target UE with which to establish a communication channel).

User Content in the Discovery Signal

A further enhancement to consider is that of allowing a discovery signal to include not only the necessary fields to identify the UE and possibly enable the identification of an Application user, but also a small amount of user content such as a plain text (e.g. for messaging) or a website address, etc. This would allow a direct transmission of user data without needing the establishment of a separate communication channel.

FIG. 10 shows a discovery signal in accordance with an example embodiment of the present invention. The discovery signal may include an ID type 1005, a PLMN identifier 1010, a UE Identifier 1015, Application user Index 1 1020, other application user index N (4-digit), Application user index N 1025, and User content 1030. The ID type 1005 may indicate the type of UE identifier, such as S-TMSI, ProSe ID, or the like. The ID type may be used only if the system allows the use of different types of identifiers. The PLMN identifier 1010 may allow identification directly or indirectly (i.e. through a mapping table), the PLMN in which the UE is registered. The PLMN identifier 1010 is optional and may be used when the UE identifier does not distinguish PLMNs. Application user Index 1 to N 1020, 1025 shows n different application user indices n=1 to N where N is the maximum number of indices that may be included. Content of the discovery signal for option 1 (shown above in FIG. 7) 1035 may include the ID type 1005, the PLMN identifier 1010 and the UE identifier 1015. Content of the discovery signal for option 2 (as shown in FIG. 8) 1040 may include the ID type 1005, the PLMN identifier 1010 and the UE identifier 1015 and application user index 1 1020 through application user index N 1025.

Content of the discovery signal for option 1 (shown above in FIG. 7) including user content 1045 may include the ID type 1005, the PLMN identifier 1010 and the UE identifier 1015 and user content 1030. Content of the discovery signal for option 2 (as shown in FIG. 8) plus user content may include the ID type 1005, the PLMN identifier 1010 and the UE identifier 1015 and application user index 1 1020 through application user index N 1025 and user content 1030.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An electronic device comprising:
circuitry configured to
acquire at least one application level identifier ID corresponding to a proximity services (ProSe) compatible application executed by the electronic device, the application level identifier allowing authentication of a user from within the ProSe compatible application without disclosing an identity of the user outside of the ProSe compatible application;

acquire a second ID associated with the application level ID, the second ID including a Non-Access-Stratum (NAS) identifier;

monitor a ProSe discovery channel for an occurrence of the second ID; and provide an indication to the application of the discovery of a device associated with the second ID upon discovery of the second ID in the discovery channel.

2. The electronic device of claim 1, wherein the circuitry is configured to:

transmit a request for the second ID associated with the application level ID to a server; and receive, from the server, the second ID in response to the request.

3. The electronic device of claim 1, wherein the second ID is statically assigned.

4. The electronic device of claim 1, wherein the circuitry is configured to receive an index value corresponding to the second ID.

5. The electronic device of claim 4, wherein the circuitry is configured to monitor the ProSe discovery channel for an occurrence of the second ID and the index value.

6. The electronic device of claim 5, wherein the circuitry is configured to provide the indication to the application of the discovery of the device subsequent to discovering an occurrence of the second ID and the index value on the discovery channel.

7. The electronic device of claim 1, wherein the circuitry is configured to receive a discovery signal indicating the second ID.

8. The electronic device of claim 7, wherein the circuitry is configured determine if a record associating the second ID with a second application level ID is stored by the electronic device.

9. The electronic device of claim 8, wherein the circuitry is configured to provide notification to the application of the discovery of the second application level ID.

10. An apparatus comprising:

circuitry configured to receive a discovery request from an application executed by the apparatus, the discovery request including at least one application level identifier (ID), the application level identifier allowing authentication of a user from within the ProSe compatible application without disclosing an identity of the user outside of the ProSe compatible application;

transmit, to a server, a request for a second ID associated with the application level ID, the second ID including a Non-Access-Stratum (NAS) identifier;

receive, from the server, the second ID;

monitor a discovery channel for an occurrence of the second ID; and provide an indication to the application of discovery of a device associated with the second ID upon discovery of the second ID in the discovery channel.

11. The apparatus of claim 10, wherein the application is a proximity services (ProSe) compatible application and the apparatus is a ProSe compatible user device.

12. The apparatus of claim 10, wherein the circuitry is configured to:

transmit the request for the second ID associated with the application level ID to a server upon receiving the discovery request; and receive the second ID from the server.

13. The apparatus of claim 12, wherein the second ID is statically assigned.

14. The apparatus of claim 10, wherein the circuitry is configured to:

receive a discovery signal indicating the second ID;

determine if a record associating the second ID to a second application level ID is stored by the apparatus; and provide notification to the application of the discovery of the second application level ID.

15. The apparatus of claim 10, wherein the circuitry is configured to:

transmit the request for the second ID associated with the application level ID to a server upon receiving the discovery request;

receive the second ID and a corresponding index value;

monitor for an occurrence of the second ID and the corresponding index value on the discovery channel; and provide the indication to application of the discovery of the device subsequent to discovering an occurrence of the second ID and the corresponding index value on the discovery channel.

16. The apparatus of claim 15, wherein the index value indicates that an application user is active and has provided a request to be discovered.

17. The apparatus of claim 15, wherein the circuitry is configured to:

receive a discovery signal indicating the second ID and an index value;

determine if a record associating the second ID to a second application level ID is stored by the apparatus;

determine if the index value matches the corresponding index value; and provide notification to the application of the discovery of the second application level ID.

18. A method performed by a mobile station, the method comprising:

receiving a discovery request from a proximity services (ProSe) compatible application executed by the mobile station, the discovery request including at least one application level identifier (ID), the application level identifier allowing authentication of a user from within the ProSe compatible application without disclosing an identity of the user outside of the ProSe compatible application;

retrieving, from an application server, a second ID associated with the application level ID, the second ID including a Non-Access-Stratum (NAS) identifier;

monitoring a discovery channel for an occurrence of the second ID; and providing an indication to the application of discovery of a device associated with the second ID upon discovery of the second ID in the discovery channel.

19. The method of claim 18, wherein the second ID is statically assigned.

20. The method of claim 18, further comprising:

transmitting a request for the second ID associated with the application level ID to the application server upon receiving the discovery request, and receiving the second ID from the application server.

* * * * *